US012573892B2

(12) United States Patent
Tokoi et al.

(10) Patent No.: US 12,573,892 B2
(45) Date of Patent: Mar. 10, 2026

(54) ROTARY ELECTRIC MACHINE

(71) Applicant: Hitachi Industrial Equipment Systems Co., Ltd., Tokyo (JP)

(72) Inventors: Hirooki Tokoi, Tokyo (JP); Mizuki Nakahara, Tokyo (JP); Toshifumi Suzuki, Tokyo (JP); Masaru Amaike, Tokyo (JP); Shuuichi Takahashi, Tokyo (JP); Yasuei Yoneoka, Tokyo (JP); Toru Sakai, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 282 days.

(21) Appl. No.: 18/276,090

(22) PCT Filed: Nov. 24, 2021

(86) PCT No.: PCT/JP2021/043074
§ 371 (c)(1),
(2) Date: Aug. 7, 2023

(87) PCT Pub. No.: WO2022/219840
PCT Pub. Date: Oct. 20, 2022

(65) Prior Publication Data
US 2024/0097508 A1 Mar. 21, 2024

(30) Foreign Application Priority Data

Apr. 14, 2021 (JP) ................................. 2021-068638

(51) Int. Cl.
*H02K 1/14* (2006.01)
*H02K 1/18* (2006.01)
*H02K 15/12* (2025.01)

(52) U.S. Cl.
CPC ............... *H02K 1/148* (2013.01); *H02K 1/18* (2013.01); *H02K 15/12* (2013.01); *H02K 2213/03* (2013.01)

(58) Field of Classification Search
CPC .......... H02K 1/146; H02K 1/148; H02K 1/16; H02K 1/18; H02K 15/021; H02K 15/12; H02K 2213/03
See application file for complete search history.

(56) References Cited

U.S. PATENT DOCUMENTS 6,710,501 B1 3/2004 Kusumoto et al.
2009/0026875 A1 1/2009 Mongeau et al.
(Continued)

FOREIGN PATENT DOCUMENTS

JP 2016-82769 A 5/2016
JP 2019-68567 A 4/2019
(Continued)

OTHER PUBLICATIONS

International Search Report (PCT/ISA/210) issued in PCT Application No. PCT/JP2021/043074 dated Jan. 18, 2022 with English translation (4 pages).
(Continued)

*Primary Examiner* — Christopher M Koehler
*Assistant Examiner* — Ethan Nguyen Vo
(74) *Attorney, Agent, or Firm* — Crowell & Moring LLP

(57) ABSTRACT

A rotary electric machine (1000) including: a rotor (200); a stator (100) surrounding a periphery of the rotor (200); a first recessed portion (133) disposed in an inner circumferential surface of a back yoke (130) of the stator (100), and extending in an axial direction of the stator (100); and a tooth (120) having one end fitted in the first recessed portion (133), a clearance formed between the first recessed portion (133) and the one end of the tooth (120) fitted in the first (Continued)

recessed portion (133) being smaller in a circumferential direction of the stator (100) than in a radial direction of the stator (100).

14 Claims, 14 Drawing Sheets

(56)                    References Cited

U.S. PATENT DOCUMENTS

| | | |
|---|---|---|
| 2009/0072639 A1 | 3/2009 | Seneff et al. |
| 2020/0044498 A1 | 2/2020 | Manz et al. |
| 2021/0013760 A1 | 1/2021 | Enomoto |
| 2021/0091611 A1 | 3/2021 | Volbers et al. |
| 2021/0249926 A1* | 8/2021 | Enomoto ................. H02K 3/50 |
| 2024/0186857 A1* | 6/2024 | Morino .................... H02K 1/16 |

FOREIGN PATENT DOCUMENTS

| | | | |
|---|---|---|---|
| JP | 2019-193462 A | 10/2019 | |
| JP | 7318012 B2 * | 7/2023 | ............. H02K 1/148 |

OTHER PUBLICATIONS

Japanese-language Written Opinion (PCT/ISA/237) issued in PCT Application No. PCT/JP2021/043074 dated Jan. 18, 2022 (3 pages).
Extended European Search Report issued in European Application No. 21937033.5 dated Feb. 12, 2025 (11 pages).
International Preliminary Report on Patentability (PCT/IB/338 & PCT/IB/373) issued in PCT Application No. PCT/JP2021/043074 dated Oct. 26, 2023, including English translation of document C2 (Japanese-language Written Opinion (PCT/ISA/237), filed on Aug. 7, 2023) (5 pages).

* cited by examiner

| | ⟨1⟩ NO CLEARANCE | ⟨2⟩ RADIAL DIRECTION CLEARANCE | ⟨3⟩ CIRCUMFERENTIAL DIRECTION CLEARANCE |
|---|---|---|---|
| CLEARANCE POSITION | | | |
| MAGNETIC FLUX DISTRIBUTION | | | |
| IRON LOSS | 1.00 | 1.03 | 1.30 |

$$2L\ 3\ \sin\theta < W3$$
$$(\text{FROM } 2Fb < Fa)$$

FIG. 15

ROTARY ELECTRIC MACHINE

TECHNICAL FIELD

The present invention relates to a rotary electric machine.

BACKGROUND ART

Rotary electric machines using a soft magnetic material such as an iron-base amorphous alloy (hereinafter, an amorphous metal) or a nanocrystalline material in an iron core have been developed in order to reduce an iron loss. However, steel plates of a soft magnetic material have a very thin plate thickness, and have as much as five or more times the Vickers hardness of an electromagnetic steel sheet. Thus, steel plates of a soft magnetic material are very difficult to manufacture, and involve high cost. A rotary electric machine for solving this problem is disclosed in Patent Document 1.

In the rotary electric machine of Patent Document 1, an iron core (stator core) of a stator is divided into a back yoke in an annular shape, the back yoke having a plurality of recessed portions in an inner circumferential surface thereof, and a plurality of teeth having one ends thereof fitted in the recessed portions and having other ends thereof projecting toward a rotor iron core. Then, the plurality of teeth are fabricated by cutting amorphous metal foil strips in a trapezoidal shape and laminating the resulting amorphous metal foil strips.

PRIOR ART DOCUMENT

Patent Document

Patent Document 1: JP-2019-68567-A

SUMMARY OF THE INVENTION

Problem to be Solved by the Invention

However, in the rotary electric machine of Patent Document 1, no consideration is given to an iron loss caused by clearances formed between the plurality of recessed portions of the back yoke and the one ends of the plurality of teeth fitted in the plurality of recessed portions. There is thus room for improvement from a viewpoint of achieving higher efficiency and higher output power.

It is an object of the present invention to provide a rotary electric machine that can decrease an iron loss caused by clearances formed between the plurality of recessed portions of the back yoke and the one ends of the plurality of teeth fitted in the plurality of recessed portions.

Means for Solving the Problem

In order to achieve the above object, according to the present invention, there is provided a rotary electric machine including: a rotor; a stator surrounding a periphery of the rotor; a first recessed portion disposed in an inner circumferential surface of a back yoke of the stator, and extending in an axial direction of the stator; and a tooth having one end fitted in the first recessed portion, a clearance formed between the first recessed portion and the one end of the tooth fitted in the first recessed portion being smaller in a circumferential direction of the stator than in a radial direction of the stator.

Advantages of the Invention

According to the present invention, it is possible to decrease an iron loss caused by the clearances formed between the plurality of recessed portions of the back yoke and the one ends of the plurality of teeth fitted in the plurality of recessed portions. Problems, configurations, and effects other than those described above will be made apparent by the following description of embodiments.

BRIEF DESCRIPTION OF THE DRAWINGS

FIG. 11 is a schematic diagram showing relation between the width of opposed faces of a back yoke and a tooth in the circumferential direction of a stator and the width of another end of the tooth in the stator of a rotary electric machine according to a third embodiment of the present invention.

FIG. 15 is a schematic diagram showing the positions of resin injection ports provided in an upper die of the molding die used to manufacture the rotary electric machine according to the fourth embodiment of the present invention, the positions being above the stator.

MODES FOR CARRYING OUT THE INVENTION

Figure 1:
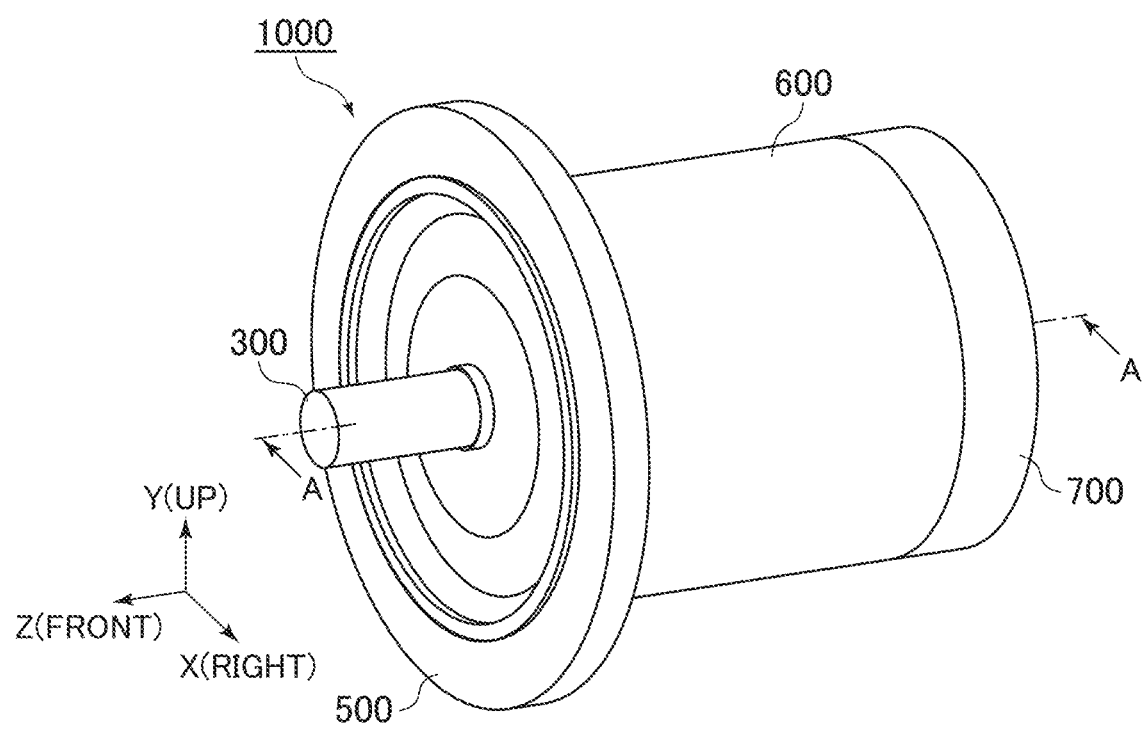
FIG. 1 is a perspective view of a rotary electric machine according to a first embodiment of the present invention.

Configurations and operations of rotary electric machines according to a first to a sixth embodiment of the present invention will hereinafter be described with reference to the drawings. Incidentally, in each figure, the same reference numerals indicate the same parts. In addition, in each figure, directions are identified by XYZ axes orthogonal to one another, and +X is defined as "right," −X is defined as "left," +Y is defined as "up," −Y is defined as "down," +Z is defined as "front," and −Z is defined as "rear."

First Embodiment

Figure 2:
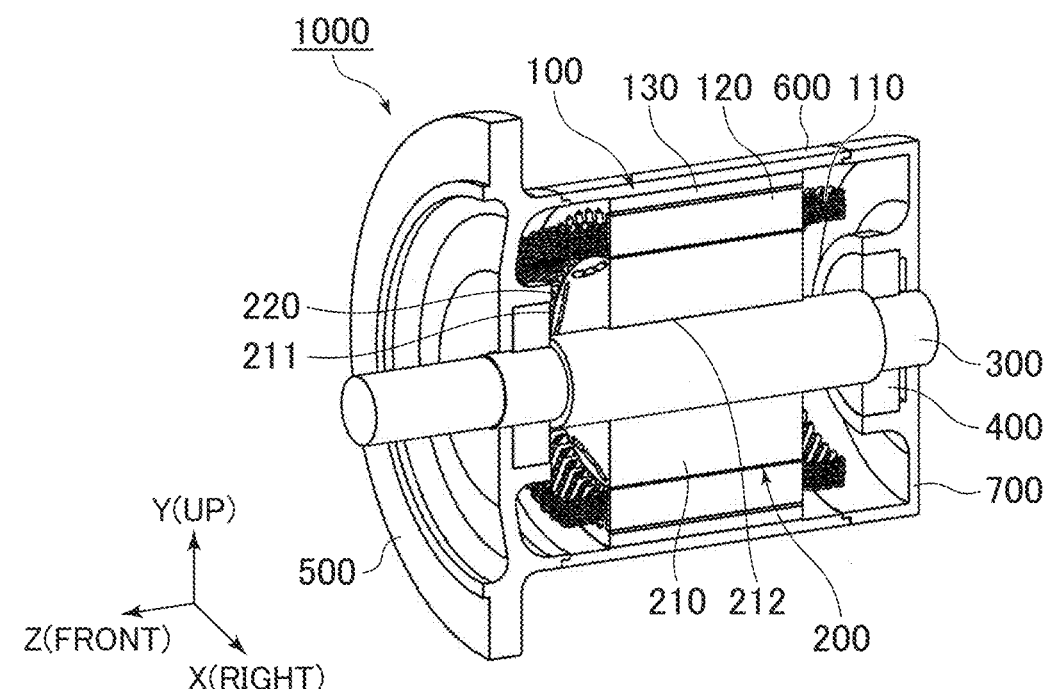
FIG. 2 is a sectional view of the rotary electric machine shown in FIG. 1, the sectional view being taken in the direction of arrows A-A.

FIG. 1 is a perspective view of a rotary electric machine 1000 according to a first embodiment of the present invention. FIG. 2 is a sectional view of the rotary electric machine 1000 shown in FIG. 1, the sectional view being taken in the direction of arrows A-A. The rotary electric machine 1000 is a radial gap rotary electric machine of an internal rotation type. The rotary electric machine 1000 includes a stator 100, a rotor 200, a shaft 300, bearings 400, a first end bracket 500, a housing 600, and a second end bracket 700.

The stator 100 is a part that generates a magnetic force for rotating the rotor 200. In the stator 100, a stator core is formed by a plurality of teeth 120 wound with coils 110 and an annular back yoke 130 coupled to the plurality of teeth 120. The back yoke 130 is fixed to the inside of the housing 600 in a cylindrical shape by means of press-fitting or the like.

The rotor 200 is a part rotated by the magnetic force generated from the stator 100. The rotor 200 is provided with a rotor core 210 constituted by a plurality of laminated plates, a plurality of magnet housing holes (magnet housing portions) 211 formed in the rotor core 210, and a plurality of permanent magnets 220 housed in the plurality of magnet housing holes 211. A through hole 212 is provided in the center of the rotor core 210. The shaft 300 is fixed to the through hole 212 by press-fitting or the like.

The shaft 300 is a shaft that rotates together with the rotor 200. The shaft 300 is rotatably supported by the bearing 400 fixed to the first end bracket 500 and the bearing 400 fixed to the second end bracket 700. The first end bracket 500 and the second end bracket 700 are attached to both sides in the axial direction of the housing 600, and close opening portions located at both ends in the axial direction of the housing 600. The first end bracket 500, the housing 600, and the second end bracket 700 protect the stator 100 and the rotor 200.

When electric power is supplied to the stator 100, the shaft 300 rotates and the rotary electric machine 1000 thus configured serves as a motor. When rotational power is supplied to the shaft 300, the rotary electric machine 1000 serves as a generator.

Figure 3:
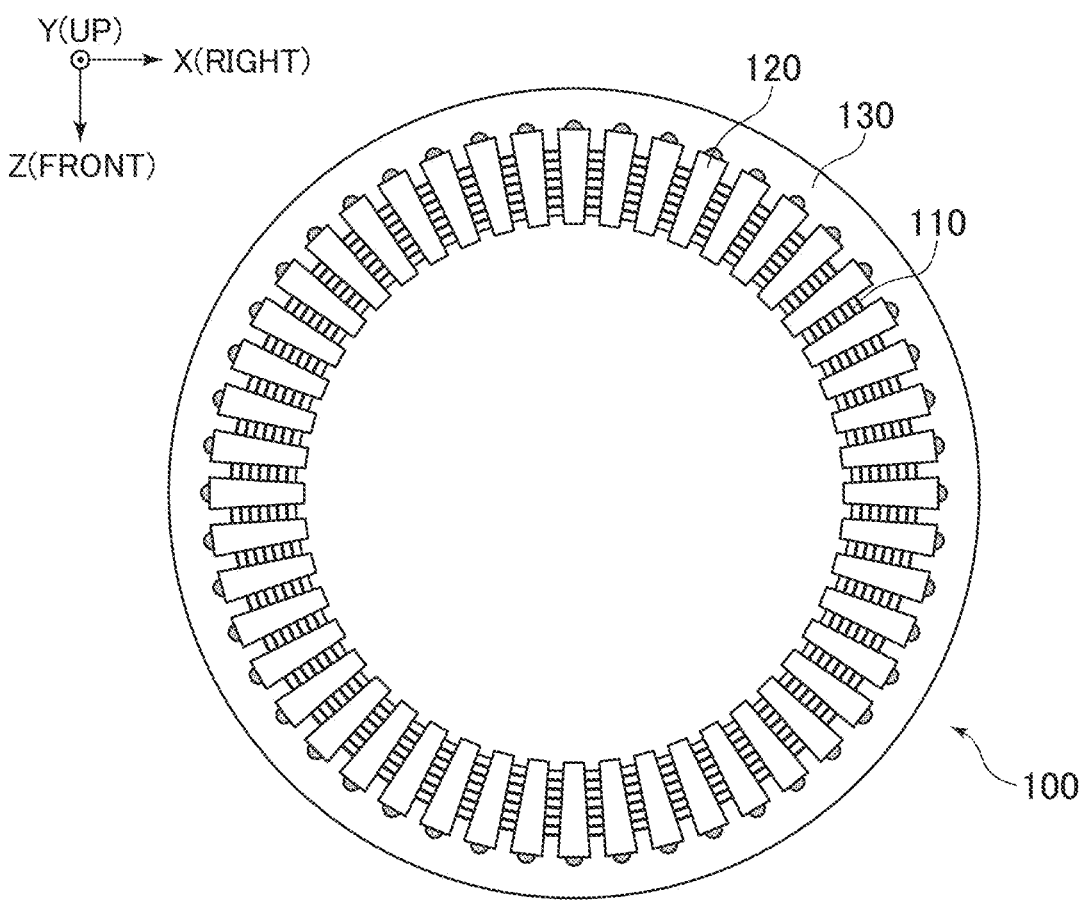
FIG. 3 is a cross-sectional view of a stator of the rotary electric machine according to the first embodiment of the present invention.

The stator 100 according to the present embodiment will next be described in detail. FIG. 3 is a cross-sectional view of the stator 100. The stator 100 includes the plurality of coils 110, the plurality of teeth 120 wound with each of the plurality of coils 110, and the back yoke 130 having the plurality of teeth 120 attached to an inner circumferential wall thereof.

As shown in FIG. 3, for example, each of the plurality of coils 110 is a rectangular wire whose sectional shape is a quadrangular shape, and can be wound around each of the plurality of teeth 120 by a distributed winding method. Incidentally, round wires whose sectional shape is a circular shape may be used as the coils 110, and the coils 110 may be wound around the plurality of teeth 120 by a concentrated winding method.

Figure 4:
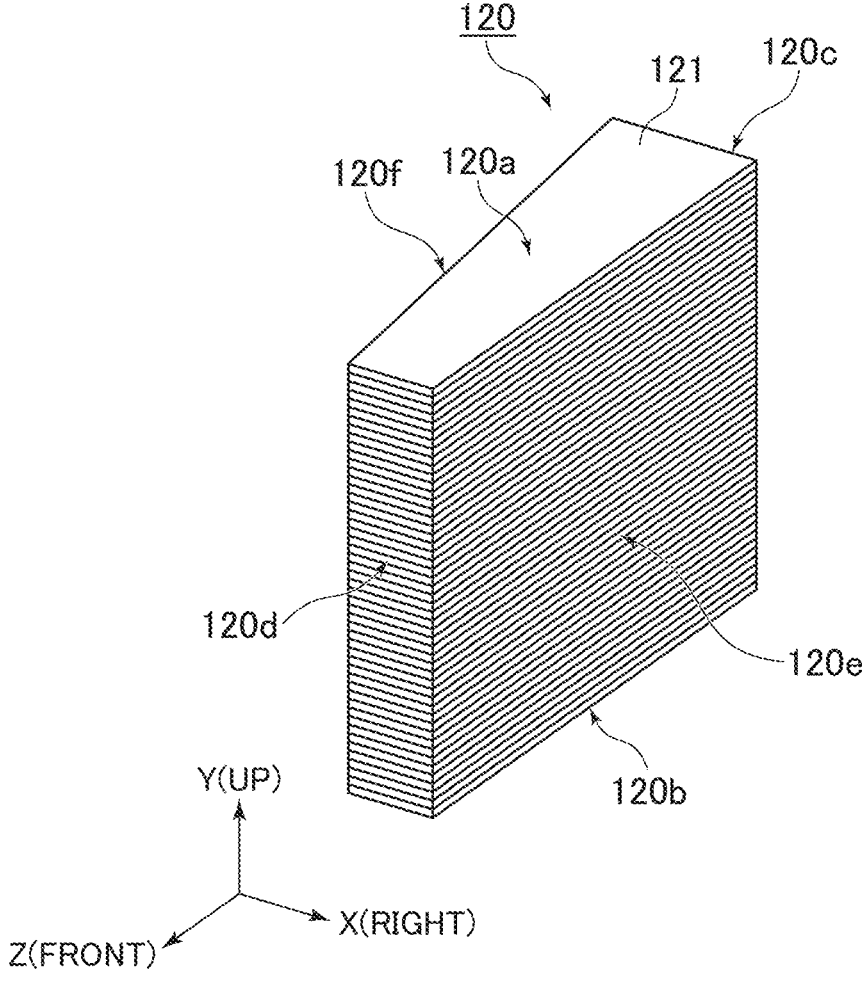
FIG. 4 is a perspective view of a tooth of the rotary electric machine according to the first embodiment of the present invention.

FIG. 4 is a perspective view of a tooth 120. As shown in this figure, the tooth 120 is a columnar iron core formed by laminating a plurality of thin plates 121. The tooth 120 has a top face 120$a$, a bottom face 120$b$, a first bottom face 120$c$, a second bottom face 120$d$, a first slope 122$e$, and a second slope 122$f$.

Figure 5:
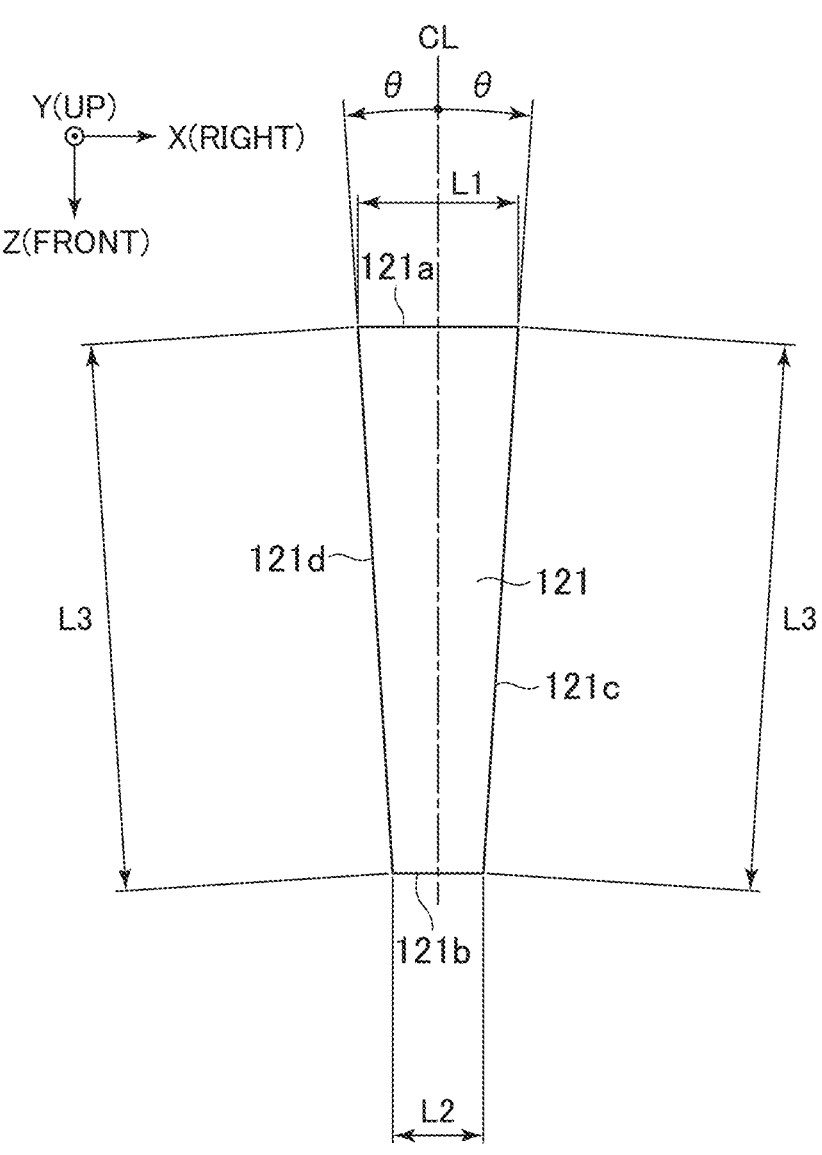
FIG. 5 is a plan view of a thin plate that forms a tooth of the rotary electric machine according to the first embodiment of the present invention.

FIG. 5 is a plan view of a thin plate 121. The thin plate 121 is a thin steel plate. The thin plate 121 is preferably formed of a low-loss soft magnetic material, for example, an amorphous metal. In addition, as shown in FIG. 5, the planar shape of the thin plate 121 is preferably a trapezoid, and the trapezoid has a first base 121$a$, a second base 121$b$, a first leg 121$c$, and a second leg 121$d$.

The first base 121$a$ forms a part of the first bottom face 120$c$ of the tooth 120. Suppose that the first base 121$a$ has a length of L1. The second base 121$b$ forms a part of the second bottom face 120$d$ of the tooth 120. Suppose that the second base 121$b$ has a length of L2. The first base 121$a$ and the second base 121$b$ may be parallel with each other as shown in FIG. 5. In this case, the length L1 of the first base 121$a$ is larger than the length L2 of the second base 121$b$.

The first leg 121$c$ is an oblique side that connects an end portion on the +X (right) side of the first base 121$a$ and an end portion on the +X (right) side of the second base 121$b$ to each other. In addition, the first leg 121$c$ forms a part of the first slope 122$e$ of the tooth 120. Suppose that the first leg 121$c$ has a length of L3. The second leg 121$d$ is an oblique side that connects an end portion on the −X (left) side of the first base 121$a$ and an end portion on the −X (left) side of the second base 121$b$ to each other. In addition, the second leg 121$d$ forms a part of the second slope 122$f$ of the tooth 120.

The first leg 121$c$ and the second leg 121$d$ may be axisymmetric with respect to a straight line CL passing through a middle point between the first base 121$a$ and the second base 121$b$, as shown in FIG. 5. In this case, the first base 121$a$ and the second base 121$b$ have the same length L3. In addition, the first base 121$a$ and the second base 121$b$ form a same angle θ with the straight line CL.

Figure 6:
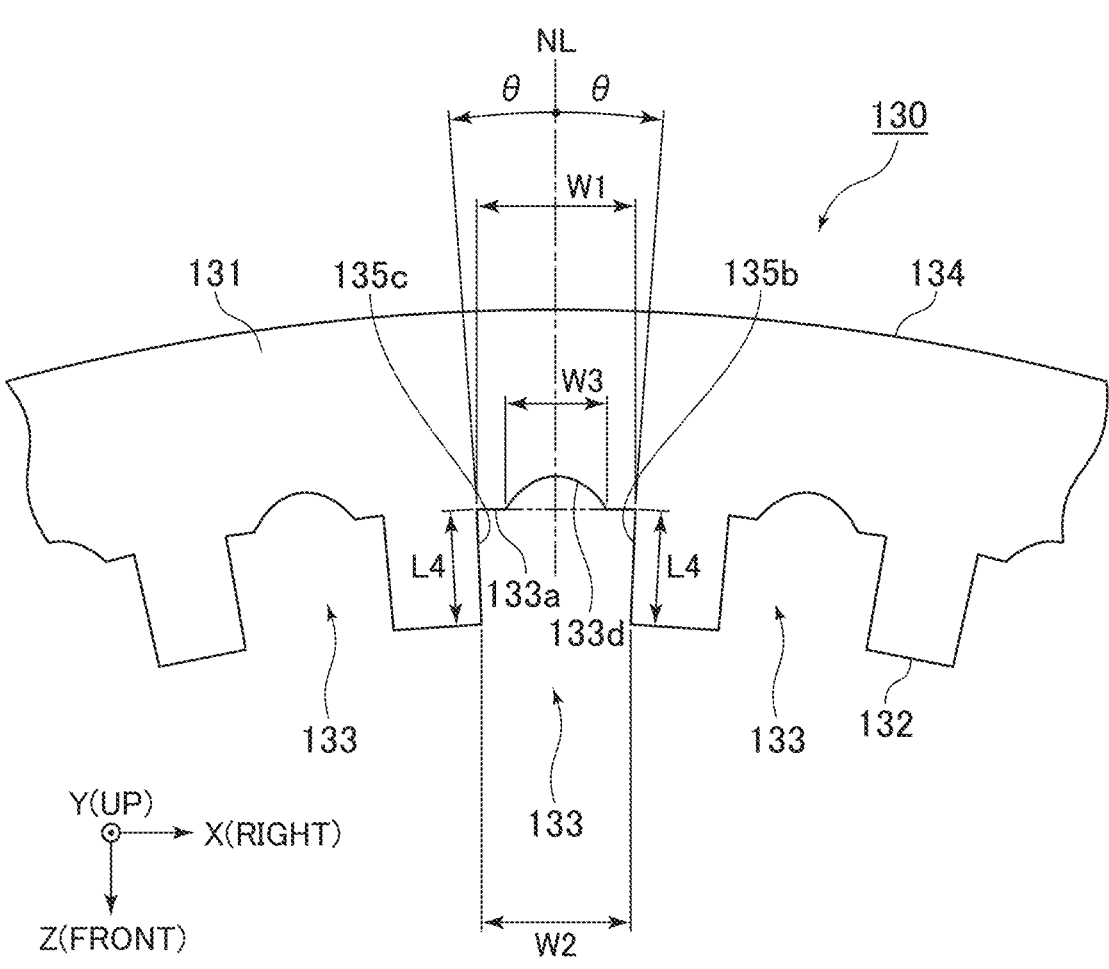
FIG. 6 is a fragmentary enlarged view of a back yoke of the rotary electric machine according to the first embodiment of the present invention.

FIG. 6 is a fragmentary enlarged view of the back yoke 130 as viewed from above along the axial direction of the stator. In the present document, FIG. 6 may be referred to as a front view of the back yoke 130. The back yoke 130 is a cylindrical iron core formed by laminating electromagnetic steel sheets 131 stamped into an annular shape. As shown in FIG. 6, an inner circumferential wall 132 of the back yoke 130 is provided with a plurality of first recessed portions 133 that extend along the axial direction of the stator 100. Each of the plurality of first recessed portions 133 has a bottom face 133*a*, a first side wall (first side face) 135*b* rising from one end of the bottom face 133*a*, the one end being one end in a circumferential direction of the stator 100, toward a central direction of the stator 100, a second side wall (second side face) 135*c* rising from another end of the bottom face 133*a*, the other end being the other end in the circumferential direction of the stator 100, toward the central direction of the stator 100, and a second recessed portion 133*d* provided to the bottom face 133*a* and extending along the axial direction of the stator 100.

The width of the bottom face 133*a* in a cross section of the back yoke 130 is W1.

Incidentally, while the second recessed portion 133*d* is provided to the bottom face 133*a* in the present embodiment, the second recessed portion 133*d* may be omitted. The bottom face 133*a* in this case may, for example, be a plane that substantially perpendicularly intersects a normal (hereinafter referred to as a normal NL) passing through the center of the bottom face 133*a* among normals to a peripheral surface 134 of the back yoke 130.

The first side wall 135*b* and the second side wall 135*c* are two side faces that sandwich the bottom face 133*a*. The first side wall 135*b* and the second side wall 135*c* may be axisymmetric with respect to the normal NL. In that case, the first side wall 135*b* and the second side wall 135*c* have a same length L4. In addition, the first side wall 135*b* and the second side wall 135*c* form a same angle θ with the normal NL.

As shown in FIG. 6, the first recessed portion 133 is preferably formed such that a distance between the first side wall 135*b* and the second side wall 135*c* (width of the first recessed portion 133) in the circumferential direction of the back yoke 130 (stator 100) decreases toward the center of the back yoke 130 (center of the stator 100). In this case, a width W2 of an opening end of the first recessed portion 133 which opening end appears in the inner circumferential wall 132 of the back yoke 130 is smaller than a width W1 of bottom face 133*a* of the first recessed portion 133.

The second recessed portion 133*d* is a recessed portion having a substantially arcuate cross section formed in, for example, a central portion in the circumferential direction of the stator 100 in the bottom face 133*a* of the first recessed portion 133. The second recessed portion 133*d* extends along the axial direction of the back yoke 130. Suppose that the second recessed portion 133*d* has a width of W3.

Figures 7, 8:
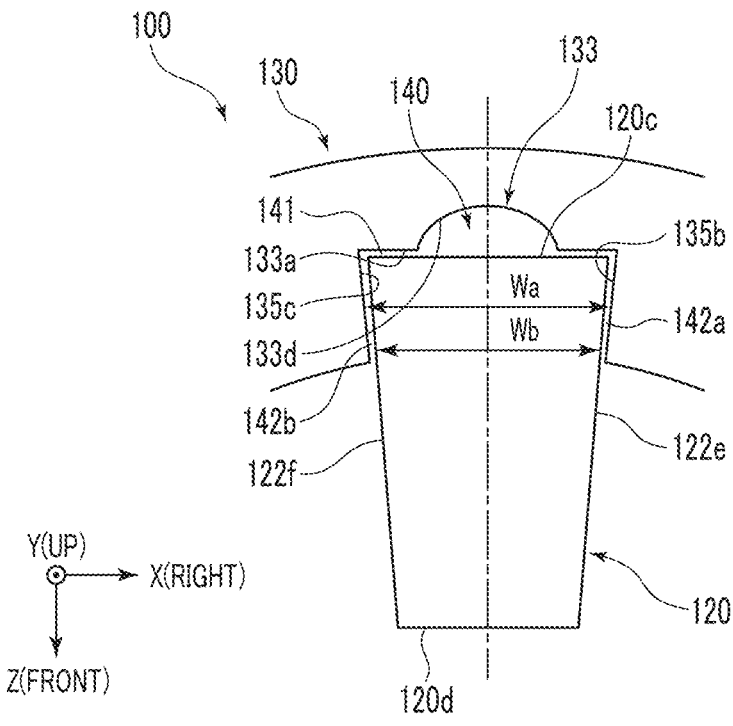
FIG. 7 is an enlarged view of a tooth having one end thereof fitted in a first recessed portion of the back yoke in the stator of the rotary electric machine according to the first embodiment of the present invention.
FIG. 8 is a table showing a result of analyzing an effect of the position of a clearance between a tooth and the back yoke of the stator of the rotary electric machine according to the first embodiment of the present invention on a magnetic flux distribution and an iron loss.

FIG. 7 is an enlarged view of the tooth 120 having one end thereof (end portion on the first bottom face 120*c* side) fitted in the first recessed portion 133 of the back yoke 130.

As shown in this figure, a width Wa of the first recessed portion 133 in the circumferential direction of the stator 100 may be monotonically decreased toward a central portion of the stator 100. In addition, a width Wb of the tooth 120 in the circumferential direction of the stator 100 may be monotonically decreased from one end (end portion on the first bottom face 120*c* side (first end portion)) of the tooth 120 toward another end (end portion on the second bottom face 120*d* side (second end portion)) of the tooth.

As is clear from FIG. 7, the length L1 (see FIG. 5) of the first base 121*a* of the tooth 120 is smaller than the width W1 (see FIG. 6) of the bottom face 133*a* of the first recessed portion 133.

In addition, the length L1 (see FIG. 5) of the first base 121*a* of the tooth 120 is larger than the width W2 (see FIG. 6) of the opening of the first recessed portion 133. Thus, the one end (end portion on the first bottom face 120*c* side) of the tooth 120 is fitted in the first recessed portion 133, and cannot fall off the first recessed portion 133 in the inside diameter direction of the back yoke 130.

The tooth 120 is fixed to the back yoke 130 such that a clearance 140 is formed between the first recessed portion 133 and the one end (end portion on the first bottom face 120*c* side) of the tooth 120 fitted in the first recessed portion 133. A radial direction clearance 141 and two circumferential direction clearances 142 (a first circumferential direction clearance 142*a* and a second circumferential direction clearance 142*b*) can be formed as the clearance 140.

The radial direction clearance 141 is a clearance formed between the first bottom face 120*c* of the tooth 120 and the bottom face 133*a* and the second recessed portion 133*d* of the first recessed portion 133. The first circumferential direction clearance 142*a* is a clearance formed between the first slope 122*e* of the tooth 120 and the first side wall (first side face) 135*b* of the first recessed portion 133. The second circumferential direction clearance 142*b* is a clearance formed between the second slope 122*f* of the tooth 120 and the second side wall (second side face) 135*c* of the first recessed portion 133.

At least one of the two circumferential direction clearances 142 is smaller than the radial direction clearance 141. That is, distances between the side walls 135*b* and 135*c* of the first recessed portion 133 and the slopes 122*e* and 122*f* of the tooth 120 are smaller (shorter or closer) than the distance between the bottom face 133*a* of the first recessed portion 133 and the first bottom face 120*c* of the tooth 120. The magnitude comparison between the distances may be made by comparing shortest distances between the side walls 135*b* and 135*c* of the first recessed portion 133 and the slopes 122*e* and 122*f* of the tooth 120 with a shortest distance between the bottom face 133*a* of the first recessed portion 133 and the first bottom face 120*c* of the tooth 120. In a case where the bottom face 133*a* of the first recessed portion 133 is provided with the second recessed portion 133*d* as in FIG. 7, for example, the distance between the bottom face 133*a* and the first bottom face 120*c* of the tooth 120, rather than the distance between the second recessed portion 133*d* and the first bottom face 120*c* of the tooth 120, is used as a target for comparison with the shortest distances between the side walls 135*b* and 135*c* and the slopes 122*e* and 122*f* of the tooth 120.

Effects

When the rotary electric machine 1000 is thus configured, a magnetic flux flowing within the tooth 120 from the other end side (second end portion) of the tooth 120 toward the one end side (first end portion) of the tooth 120 flows to projecting portions of the back yoke 130 (projecting portion between two first recessed portions 133 adjacent to each other) via the slopes 122*e* and 122*f* of the tooth 120. This can reduce concentration of the magnetic flux around the first recessed portion 133 in the back yoke 130, and can therefore reduce an iron loss occurring in the back yoke 130. In the present embodiment in particular, the iron loss can be further reduced because the tooth 120 is formed of an amorphous metal.

Hence, the present embodiment can reduce the iron loss caused by the clearance between the back yoke 130 and the tooth 120, and can therefore achieve a higher efficiency and a higher output of the rotary electric machine 1000.

Incidentally, from a viewpoint of further reducing the iron loss, it is preferable to set at least one of the two circumferential direction clearances 142 to zero, that is, bring at least one of the two slopes 122*e* and 122*f* of the tooth 120 and the corresponding side wall 135*b* or 135*c* of the first recessed portion 133 into contact with each other. When the slope 122 (for example, the slope 122*e* or 122*f*) and the side wall 135 (for example, the side wall 135*b* or 135*c*) facing the slope 122 are thus brought into contact with each other, the magnetic flux flows easily from the slope 122 of the tooth 120 to a projecting portion (projecting portion between two first recessed portions 133 adjacent to each other) of the back yoke 130. As a result, the iron loss of the rotary electric machine 1000 can be reduced.

Effects of the present embodiment will next be described in more detail with reference to FIG. 8. FIG. 8 is a table showing a result of analyzing an effect of the position of the clearance formed between the tooth 120 and the back yoke 130 of the rotary electric machine according to the present embodiment on a magnetic flux distribution and the iron loss. Incidentally, unlike the first recessed portion 133 in FIG. 7, the first recessed portion 133 of the back yoke 130 in FIG. 8 is not provided with the second recessed portion 133*d*.

A "clearance position" in FIG. 8 illustrates kinds of positions of clearances formed between the tooth 120 and the back yoke 130. Here, three kinds <1> to <3> are illustrated.

"No clearance" of <1> represents a case where there is no clearance between the tooth 120 and the back yoke 130 (that is, the radial direction clearance 141 and the two circumferential direction clearances 142 are absent), in which case the one end of the tooth 120 is in close contact with the bottom face 133*a* and each of the two side walls 135*b* and 135*c* of the first recessed portion 133. However, when the rotary electric machine is actually manufactured, the first recessed portion 133 needs to be formed so as to be larger than the one end of the tooth 120, and therefore it is very difficult to fit the tooth 120 and the first recessed portion 133 to each other with no clearance at all as in <1>.

A "radial direction clearance" of <2> represents a case close to the present embodiment described above, in which case the radial direction clearance 141 is present, but the two circumferential direction clearances 142 (142*a* and 142*b*) are absent. That is, the first bottom face 120*c* of the tooth 120 and the bottom face 133*a* of the first recessed portion 133 are separated from each other, and the radial direction clearance 141 is formed. However, the first slope 122*e* of the tooth 120 and the first side wall 135*b* of the first recessed portion 133 are in close contact with each other, and the second slope 122*f* of the tooth 120 and the second side wall 135*c* of the first recessed portion 133 are in close contact with each other.

A "circumferential direction clearance" of <3> represents a case where the radial direction clearance 141 is absent but the two circumferential direction clearances 142 (142*a* and 142*b*) are present. That is, the first bottom face 120*c* of the tooth 120 and the bottom face 133*a* of the first recessed portion 133 are in close contact with each other. However, the first slope 122*e* of the tooth 120 and the first side wall 135*b* of the first recessed portion 133 are separated from each other, and the second slope 122*f* of the tooth 120 and the second side wall 135*c* of the first recessed portion 133 are separated from each other. The circumferential direction clearances 142 are formed between the first slope 122*e* of the tooth 120 and the first side wall 135*b* of the first recessed portion 133 and between the second slope 122*f* of the tooth 120 and the second side wall 135*c* of the first recessed portion 133.

"Magnetic flux distributions" and "iron losses" at the respective clearance positions of <1> to <3> will be compared with one another.

In the case of <1>, a magnetic flux entering through the second bottom face 120*d* (other end) of the tooth 120 passes through a part where the first slope 122*e* of the tooth 120 and the first side wall 135*b* of the first recessed portion 133 are in contact with each other, and flows to an adjacent tooth 120 and the back yoke 130. When the iron loss in this case is set as a reference (1.00), a magnetic flux distribution substantially similar to that in the case of <1> is exhibited in the case of <2>, which is close to the present embodiment, and the iron loss in the case of <2> is 1.03, which is substantially similar to that in the case of <1>.

In the case of <3>, on the other hand, a magnetic flux entering through the second bottom face 120*d* of the tooth 120 passes through a part where the first bottom face 120*c* of the tooth 120 and the bottom face 133*a* of the first recessed portion 133 are in close contact with each other, and most of the magnetic flux flows to the outer circumferential side of the back yoke 130. That is, magnetic flux density on the outer circumferential side of the back yoke 130 is increased as compared with the cases of <1> and <2>. Thus, the iron loss is 1.3, that is, the iron loss is as much as 1.30 times the iron loss in <1>.

As is clear from this analysis result, when the distances between the side walls 135*b* and 135*c* of the first recessed portion 133 and the slopes 122*e* and 122*f* of the tooth 120 are made smaller than the distance between the bottom face 133*a* of the first recessed portion 133 and the first bottom face 120*c* of the tooth 120, an increase in the magnetic flux density can be reduced, and therefore the iron loss of the back yoke 130 can be reduced. That is, the iron loss of the back yoke 130 can be brought closer to that in the ideal case of <1>. Incidentally, the planar shape of the thin plates 121 is a trapezoid. Thus, a steel plate of a soft magnetic material such as an amorphous metal or the like can be processed easily.

Second Embodiment

As described above, from a viewpoint of further reducing the iron loss, the side faces of the first recessed portion 133 (the first side wall 135*b* and the second side wall 135*c*) are preferably in contact with the one end of the tooth 120 (the first slope 122*e* and the second slope 122*f* on the first bottom face 120*c* side).

Accordingly, in the present embodiment, a clearance between the first bottom face 120*c* of the tooth 120 and the second recessed portion 133*d* of the back yoke 130 (see FIG. 7) is filled with a thermosetting resin 150 by transfer molding. That is, the clearance (radial direction clearance 141) formed between the first recessed portion 133 and the one end (end portion on the first bottom face 120*c* side) of the tooth 120 fitted in the first recessed portion 133 is filled with the resin 150 that is in contact with the bottom face 133*a* of the first recessed portion 133 and an end face (first bottom face 120*c*) of the one end of the tooth which end face is opposed to the bottom face 133*a* of the first recessed portion 133.

Figure 9:
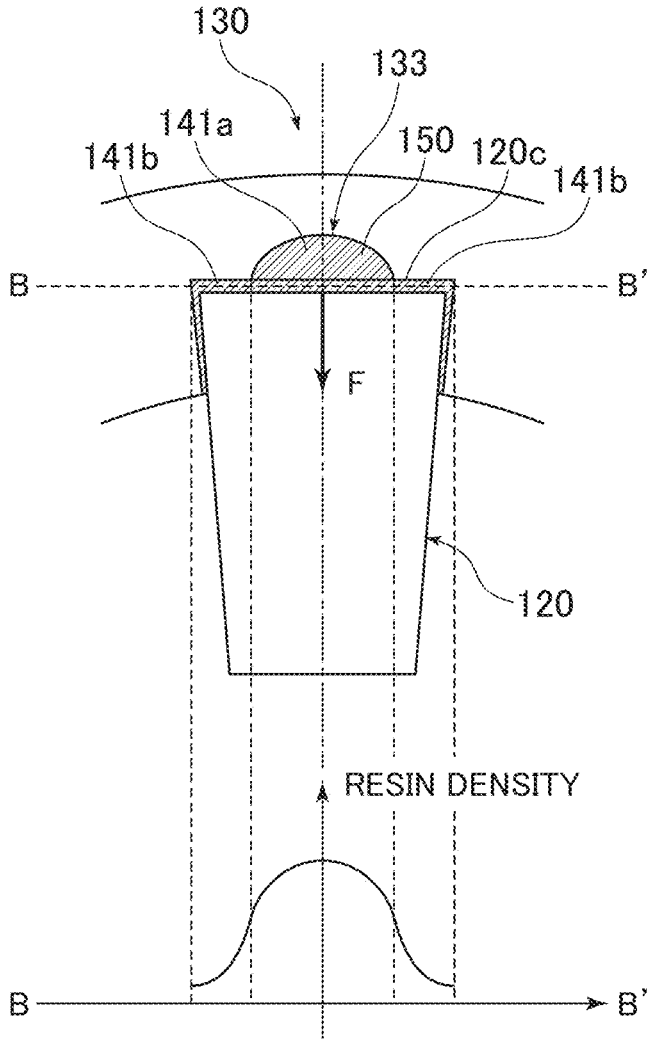
FIG. 9 is a graph showing an example of the density distribution of a resin filled in a clearance between a bottom face of a back yoke and a first bottom face of a tooth in the stator of a rotary electric machine according to a second embodiment of the present invention.

FIG. 9 is a diagram showing an example of the density distribution of the resin 150 in a graph together with an enlarged view of the stator 100 in which the clearance between the first recessed portion 133 of the back yoke 130 and the first bottom face 120*c* of the tooth 120 is filled with the resin 150.

In general, the density of the resin 150 filled in the clearance by transfer molding is in positive correlation with pressure applied to each part of the resin 150 at a time of the molding processing. Therefore, in a part where the width of the clearance is large, as compared with a part where the width of the clearance is small, more resin 150 flows into the part, the pressure of the resin 150 is thus relatively high, and consequently the density of the resin 150 is relatively high. As a result, in the part where the width of the clearance is small, the density of the resin 150 is relatively low.

In the present embodiment, a first radial direction clearance 141*a* formed between the second recessed portion 133*d* and the first bottom face 120*c* corresponds to the part where the width of the clearance is large. In addition, a second radial direction clearance 141*b* formed between a remaining bottom face 133*a* resulting from excluding the part provided with the second recessed portion 133*d* from the bottom face 133*a* of the first recessed portion 133 and the one end (first bottom face 120*c*) of the tooth 120 corresponds to the part where the width of the clearance is small. Hence, the density distribution of the resin 150 filled in the clearance between the bottom face 133*a* of the back yoke 130 and the first bottom face 120*c* of the tooth 120 in the stator 100 according to the present embodiment is as indicated in the graph shown in a lower portion of FIG. 9.

In the graph of FIG. 9, the density is highest in a central portion of the first recessed portion 133. Thus, a large force F that presses the tooth 120 toward the central portion of the stator 100 can be generated in the central portion of the first recessed portion 133. This pressing force F moves the tooth 120 toward the central portion of the stator 100 (in the inside diameter direction of the back yoke 130), and can also ultimately bring the slopes 122*e* and 122*f* of the tooth 120 into close contact with the side walls 135*b* and 135*c* of the first recessed portion 133, as shown in FIG. 10.

Figure 10:
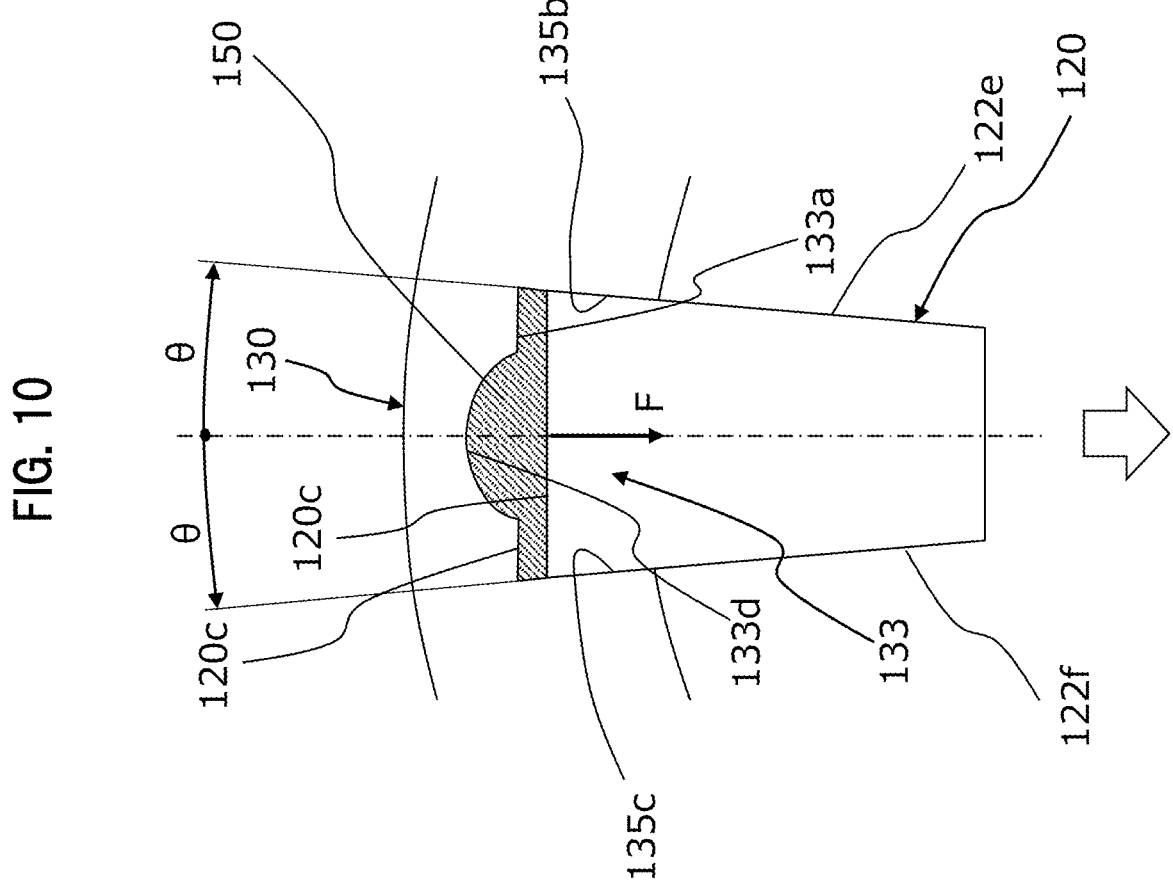
FIG. 10 is a fragmentary enlarged view of a stator core in which a resin is filled in a clearance between a second recessed portion of the back yoke and the first bottom face of the tooth in the stator of the rotary electric machine according to the second embodiment of the present invention.

FIG. 10 is a fragmentary enlarged view of the stator core, the fragmentary enlarged view showing a state in which the slopes 122*e* and 122*f* of the tooth 120 are brought into contact with the side walls 135*b* and 135*c* of the first recessed portion 133 by filling the resin 150 into the clearance between the first recessed portion 133 of the back yoke 130 and the first bottom face 120*c* of the tooth 120.

The angles that the first slope 122*e* and the second slope 122*f* of the tooth 120 form with the straight line CL (see FIGS. 4 and 5) and the angles that the first side wall 135*b* and the second side wall 135*c* of the first recessed portion 133 form with the normal NL (see FIG. 6) are the same angle G. Therefore, the first slope 122*e* and the second slope 122*f* of the tooth 120 respectively come into close contact with the first side wall 135*b* and the second side wall 135*c* of the back yoke 130. Hence, the clearance 140 formed between the first recessed portion 133 and the one end of the tooth 120 fitted in the first recessed portion 133 is smaller in the circumferential direction of the stator 100 than in the radial direction of the stator 100.

Incidentally, the resin 150 filled in the clearance between the tooth 120 and the back yoke 130 is heated and cured. This maintains a state in which the clearance 140 formed between the first recessed portion 133 and the one end of the tooth 120 fitted in the first recessed portion 133 is smaller in the circumferential direction of the stator 100 than in the radial direction of the stator 100.

When the slopes 122*e* and 122*f* of the tooth 120 are brought into close contact with the side walls 135*b* and 135*c* of the first recessed portion 133 by filling the clearance 140 with the resin 150 as in the present embodiment, a fear of occurrence of chipping or cracking in the tooth 120 and the first recessed portion 133 is reduced as compared with a case where a wedge or the like is press-fitted into the clearance 140.

In addition, the pressing force applied by the resin 150 can be adjusted by changing the width of the clearance 140 filled with the resin 150 or the size of the second recessed portion 133*d* in the present embodiment. It is thereby possible to reduce an excessive pressure that may be applied to the faces brought into close contact with each other, and reduce a degradation in magnetic characteristics of the tooth 120 and the back yoke 130.

Third Embodiment

In the present embodiment, referring to FIG. 11, description will be made of a preferable value of an embedment depth L5 of the tooth 120 with respect to the first recessed portion 133 in the second embodiment.

Figure 11:
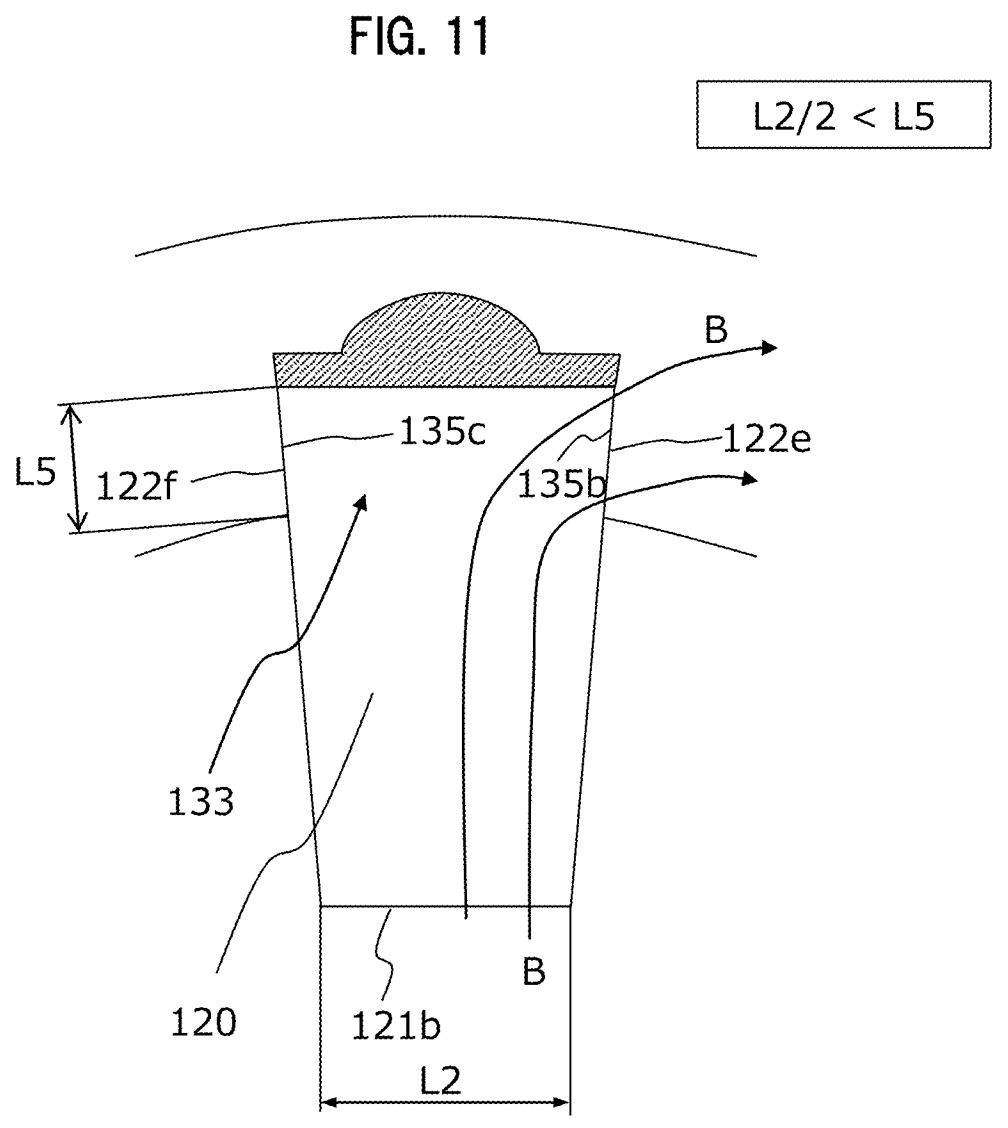

FIG. 11 is a schematic diagram showing relation between the embedment depth L5 of the tooth 120 with respect to the first recessed portion 133 and the width L2 of the other end (second bottom face 120*d*) of the tooth 120 in the circumferential direction of the stator 100.

The embedment depth L5 represents the length of a part where the side walls 135*b* and 135*c* of the first recessed portion 133 are in contact with the slopes 122*e* and 122*f* of the tooth 120 in the cross section of the back yoke 130. As indicated by an equation in FIG. 11, the embedment depth L5 is preferably larger than half the width L2 of the second bottom face 120*d* of the tooth 120.

Thus setting the embedment depth L5 can further reduce concentration of the magnetic flux around the first recessed portion 133 in the back yoke 130, and can therefore reduce the iron loss of the back yoke 130.

Incidentally, while FIG. 11 shows only a magnetic flux B passing through a part where the first slope 122*e* and the second side wall 135*c* are in close contact with each other, it is needless to say that there is a magnetic flux passing through a part where the second slope 122*f* and the second side wall 135*c* are in close contact with each other.

Fourth Embodiment

Figure 12:
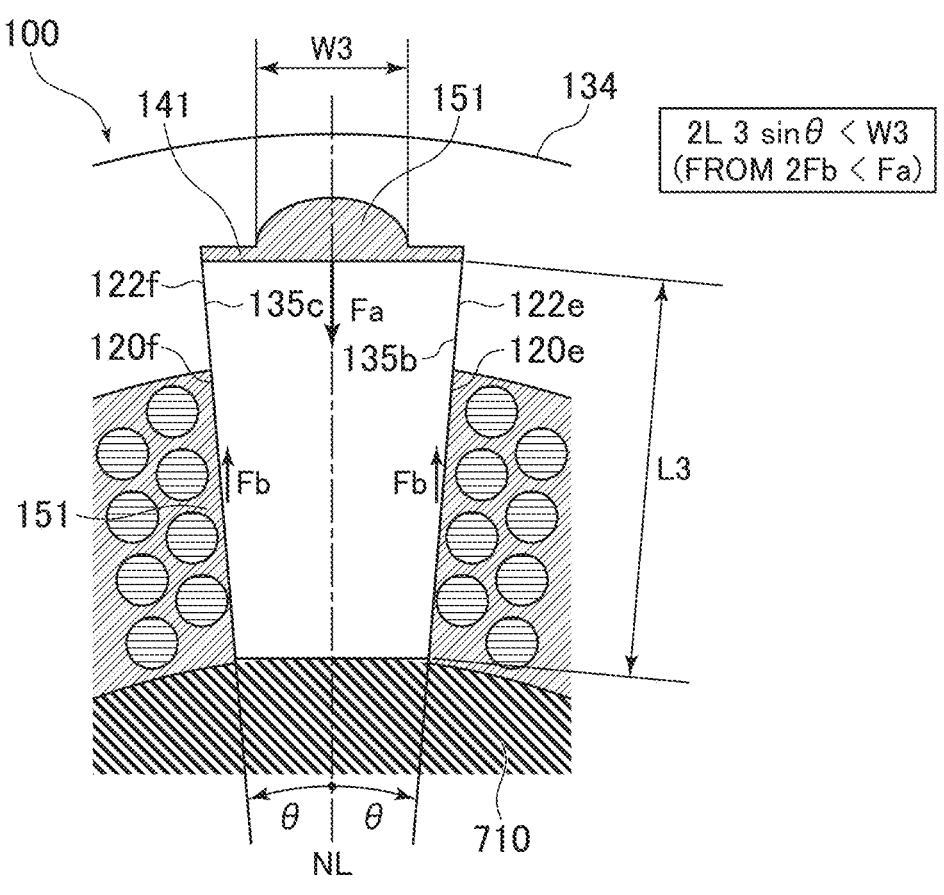
FIG. 12 is a fragmentary enlarged view of a stator filled with a molding resin in a rotary electric machine according to a fourth embodiment of the present invention.

FIG. 12 is a fragmentary enlarged view of the stator 100 filled with a resin in a rotary electric machine according to the present embodiment. The stator 100 according to the present embodiment is different from the stator 100 according to the first embodiment in that the resin 150 further covers the side walls (the first slope 122*e* and the second slope 122*f*) of the tooth 120, the side walls being side walls in the circumferential direction of the stator 100. Specifically, the stator 100 according to the present embodiment is covered by a molding resin 151, and the molding resin 151 is filled in the radial direction clearance 141 and between two teeth 120 adjacent to each other.

As shown in FIG. 12, letting L3 be the width of the first slope 122*e* of the tooth 120, and letting e be angles that the first slope 122*e* and the second slope 122*f* form with the normal NL to the peripheral surface 134 of the back yoke 130, the normal NL passing through a center between the first slope 122*e* and the second slope 122*f*, the width W3 of the second recessed portion 133*d* is preferably W3>2×L3 sin θ.

This assumes that the resin 150 applies a uniform pressure P to the first bottom face 120*c*, the first slope 122*e*, and the second slope 122*f*. In this case, a force Fa that is applied to the first bottom face 120*c* and presses the tooth 120 in the inside diameter direction of the back yoke 130 is P×W3× (axial length). On the other hand, a force Fb that is applied to each of the first slope 122e and the second slope 122f and presses the tooth 120 in the outside diameter direction of the back yoke 130 is P×L3×(axial length)×sin θ.

Fa>2Fb needs to hold in order to hold the side faces (the first side wall 135b and the second side wall 135c) of the first recessed portion 133 and the one end (the first slope 122e and the second slope 122f on the first bottom face 120c side) of the tooth 120 in close contact with each other. Hence, W3>2×L3 sin θ.

Incidentally, the coils 110 and an insulator are inserted in a slot portion (between two teeth 120 adjacent to each other). Therefore, the pressure of the resin 150 which pressure acts on the first slope 122e and the second slope 122f is reduced to be lower than the pressure of the resin 150 which pressure acts on the first bottom face 120c. Hence, "W3>2×L3 sin θ" is a dimensional condition calculated on a safe side.

Thus, in the rotary electric machine satisfying "W3>2×L3 sin θ," even when the forces Fb that press the tooth 120 in the outside diameter direction of the back yoke 130 are generated from the integral mold, a pressure in the inside diameter direction of the back yoke 130 is applied to the tooth 120. Thus, a force acts so as to hold the side faces (the first side wall 135b and the second side wall 135c) of the first recessed portion 133 and the one end (the first slope 122e and the second slope 122f on the first bottom face 120c side) of the tooth 120 in close contact with each other.

Figure 14:
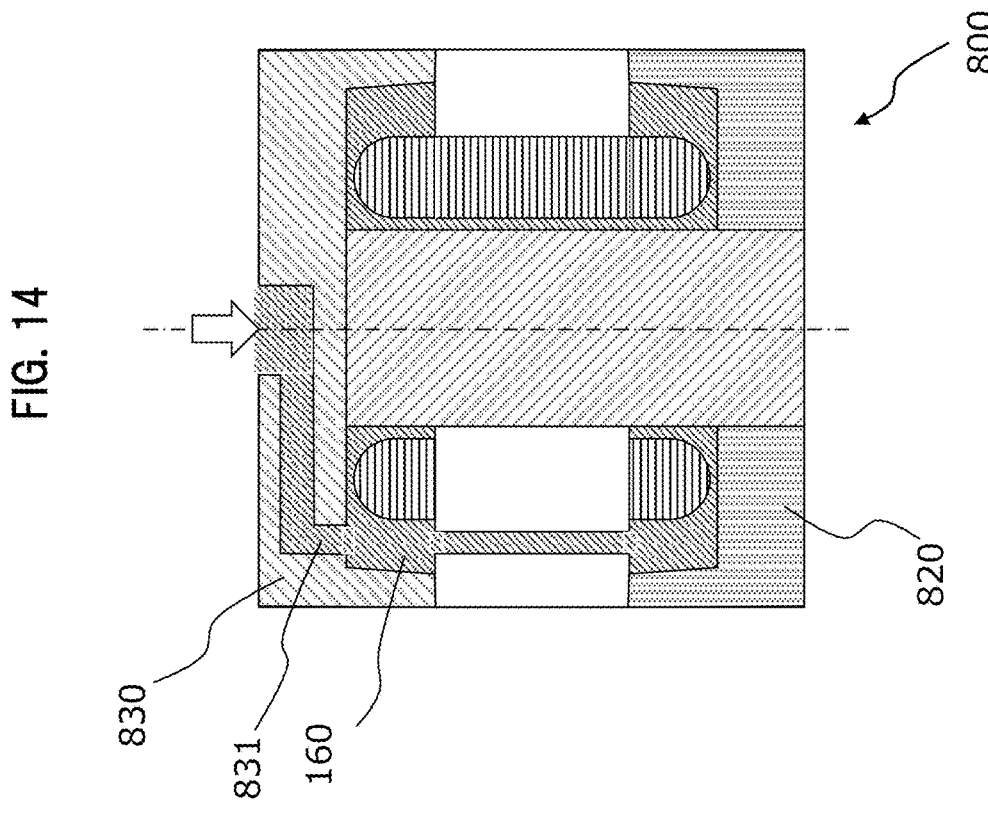
FIG. 14 is a sectional view of the molding die used to manufacture the rotary electric machine according to the fourth embodiment of the present invention and the stator placed in the molding die and filled with the molding resin.
Figure 13:
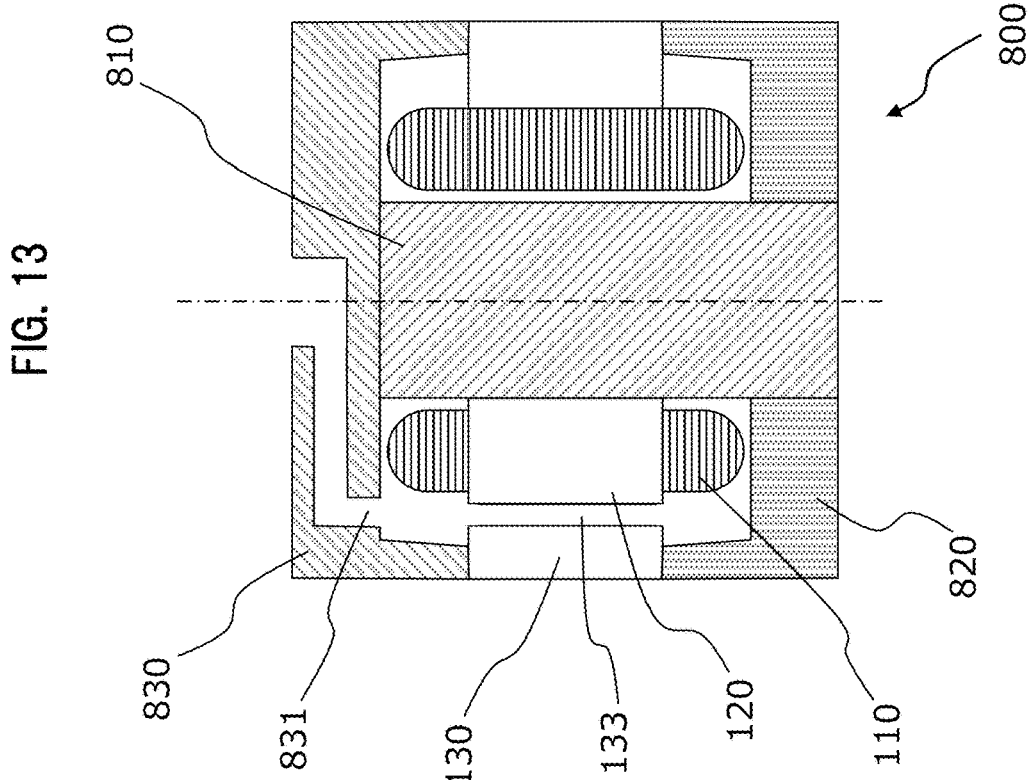
FIG. 13 is a sectional view of a molding die used to manufacture the rotary electric machine according to the fourth embodiment of the present invention and the stator placed in the molding die to be filled with the molding resin.
Figure 15:
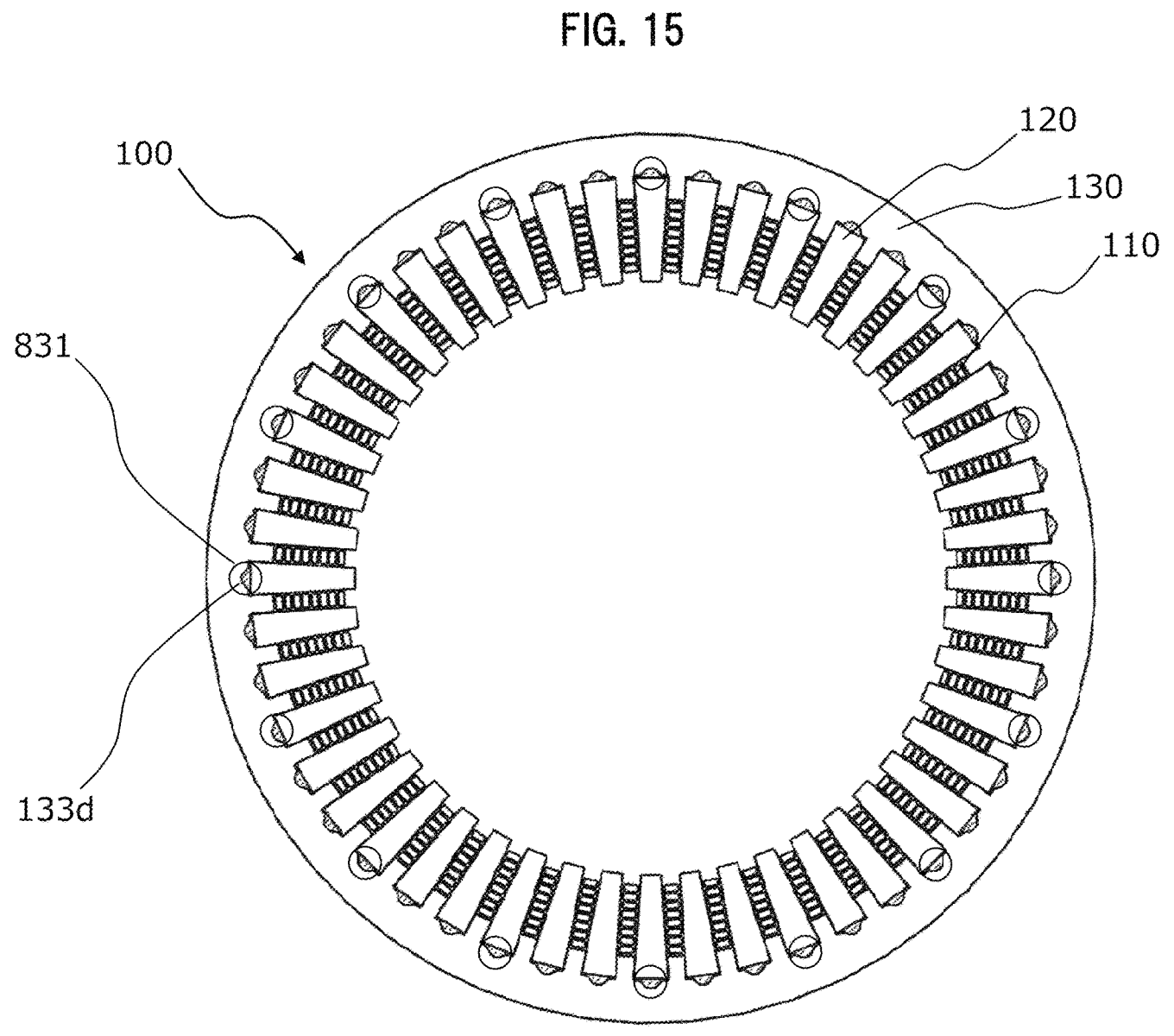

A method of manufacturing the stator 100 according to the present embodiment will next be described. FIG. 13 is a sectional view of a molding die 800 used to manufacture the rotary electric machine according to the present embodiment and the stator 100 placed in the molding die 800 to be filled with the molding resin 151. FIG. 14 is a sectional view of the molding die 800 used to manufacture the rotary electric machine according to the present embodiment and the stator 100 placed in the molding die 800 and filled with the molding resin 151. FIG. 15 is a schematic diagram obtained by projecting, onto the stator 100, positions in the stator axial direction of resin injection ports 831 provided in an upper die 830 of the molding die 800 used to manufacture the rotary electric machine according to the present embodiment.

The molding die 800 includes a cylindrical core die 810 disposed on the inner circumference of the stator, a lower die 820 disposed on the bottom face of the stator, and the upper die 830 disposed on the top face of the stator and provided with gates 831 serving as injection ports of the resin 150. The gates 831 are located above the second recessed portion 133d and on the outside diameter side of the stator 100 or directly above the second recessed portion 133d (directly above the second recessed portion 133d in FIG. 15), and a plurality of the gates 831 are arranged at equal intervals in the circumferential direction of the stator 100.

As shown in FIG. 14, a plunger (not shown) applies a pressure from an upper portion of the upper die 830 to the resin 150 having fluidity by being stored in a pot or the like and heated in advance. The resin 150 is extruded from the gate 831 to the stator 100 and the inside of the molding die 800, and reaches the lower die 820 through the second recessed portion 133d and clearances between the coils 110.

When the resin 150 is filled within the stator 100 to a certain degree, the pressure from the plunger (not shown) is propagated to the resin 150 within the stator 100, and the pressure of the resin 150 gradually rises. Consequently, an excess air within the stator 100 escapes from clearances in the molding die 800, and the resin 150 fills even narrow parts between the coils 110 and the like. After completion of the filling, the stator 100 integral with a resin mold is completed by thermal curing. Incidentally, the resin 150 may be filled into the stator 100 by transfer molding.

In the molding die according to the present embodiment, the position of the gate 831 is set above the second recessed portion 133d. Thus, the resin 150 is easily filled from the second recessed portion 133d, and the resin 150 does not easily enter fitting portions (a part where the first slope 122e and the second side wall 135c face each other and a part where the second slope 122f and the second side wall 135c face each other). Even when the resin 150 enters the fitting portions, a load in the inside diameter direction of the stator 100 which load acts on the tooth 120 ultimately extrudes the resin 150. However, it is difficult to extrude the resin 150 completely. Thus, the resin 150 is filled from the second recessed portion 133d, and clearances in the fitting portions are closed in an early stage. The close contact property of the fitting portions can be thereby further enhanced.

In a case where the resin 150 is integrally molded by using a molding resin, a need for filling each second recessed portion 133d with the resin 150 as in the first embodiment is obviated. It is therefore possible to reduce the number of man-hours for resin filling. Incidentally, the above-described effect is obtained when the position of the gate 831 is set on the outside diameter side of the second recessed portion 133d. Therefore, the position of the gate 831 does not have to be directly above the second recessed portion 133d.

Fifth Embodiment

Figure 16:
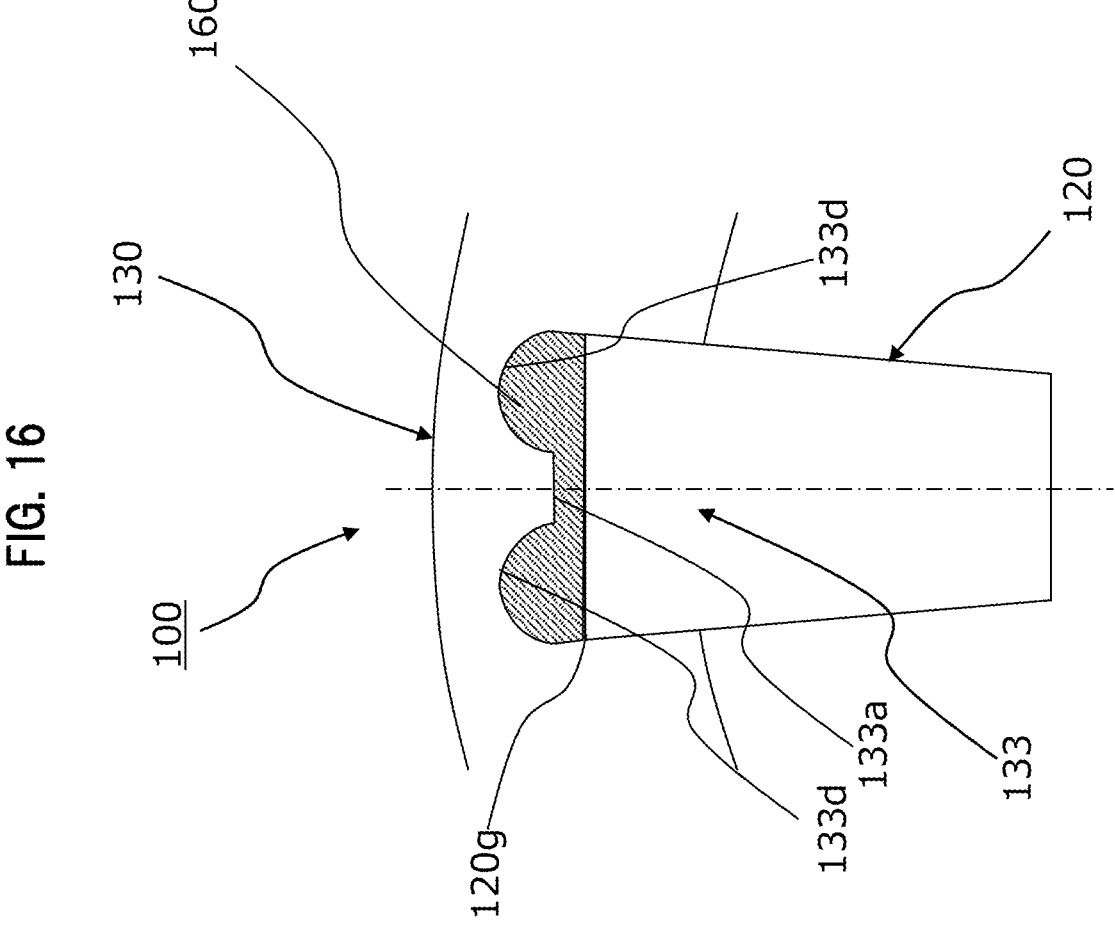
FIG. 16 is a fragmentary enlarged view of the stator of a rotary electric machine according to a fifth embodiment of the present invention.

FIG. 16 is a fragmentary enlarged view of the stator of a rotary electric machine according to the present embodiment. The stator 100 according to the present embodiment is different from the stator 100 according to the first embodiment in terms of the number and position of second recessed portions 133d provided to the bottom face 133a of the first recessed portion 133 of the back yoke 130. Specifically, second recessed portions 133d are respectively provided to both ends of the bottom face 133a of the first recessed portion 133 in the cross section of the back yoke 130. Hence, two second recessed portions 133d are provided to the bottom face 133a of the first recessed portion 133.

By providing the second recessed portions 133d to both ends of the bottom face 133a, it is possible to reduce interference of corners 120g of the tooth 120 with the bottom face 133a of the first recessed portion 133 when the tooth 120 is inserted into the first recessed portion 133 of the back yoke 130. In addition, even when the interference occurs, frictional force occurring at the corners 120g of the tooth 120 can be reduced. From the above, assembling workability can be improved.

Sixth Embodiment

Figures 17, 18:
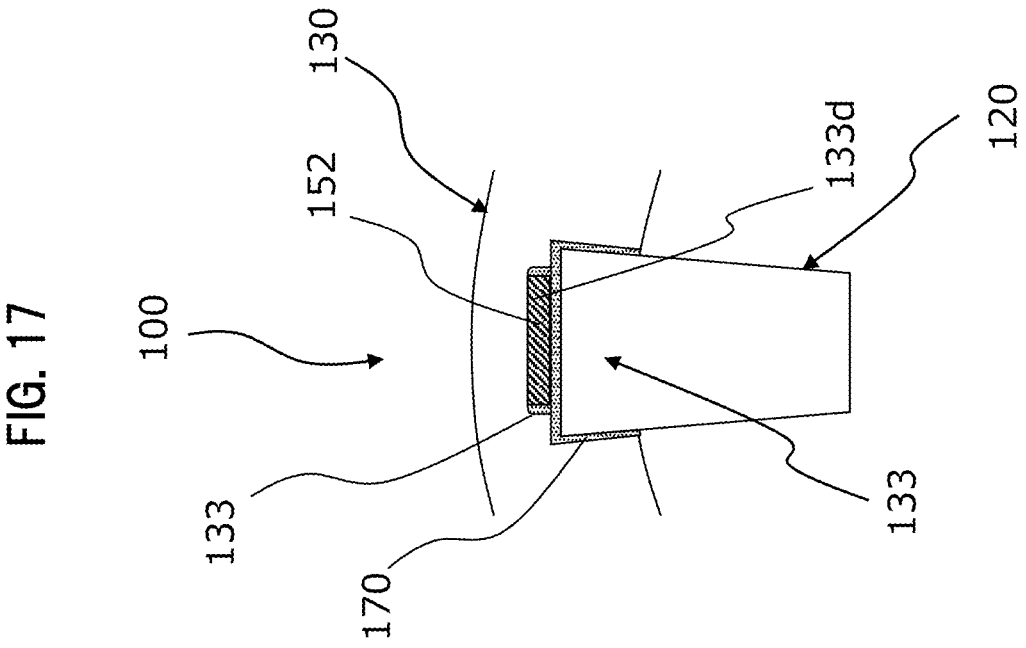
FIG. 17 is a fragmentary enlarged view before a foaming resin provided to a second recessed portion is foamed in the stator of a rotary electric machine according to a sixth embodiment of the present invention.
FIG. 18 is a fragmentary enlarged view after the foaming resin provided to the second recessed portion is foamed in the stator of the rotary electric machine according to the sixth embodiment of the present invention.

FIG. 17 is a fragmentary enlarged view before a foaming resin 152 provided to the second recessed portion 133d is foamed in the stator 100 of a rotary electric machine according to the present embodiment. FIG. 18 is a fragmentary enlarged view after the foaming resin 152 provided to the second recessed portion 133d is foamed in the stator 100 according to the present embodiment.

The stator 100 according to the present embodiment is different from the stator 100 according to the first embodiment in that the resin is the foaming resin 152. The foaming resin 152 is, for example, an insulative foaming epoxy resin. The foaming resin 152 is applied to the second recessed portion 133*d* of the back yoke 130 in advance before the tooth 120 is inserted into the first recessed portion 133 of the back yoke 130. Then, after the tooth 120 is inserted into the first recessed portion 133 of the back yoke 130, the foaming resin 152 is foamed by being heated and is thereafter cured. The foaming of the foaming resin 152 pushes out the tooth 120 in the inside diameter direction of the back yoke 130.

The rotary electric machine according to the present embodiment enables the tooth 120 and the back yoke 130 to be brought into close contact with each other in the circumferential direction without an excessive shearing force being applied to the tooth 120 and the back yoke 130. It is therefore possible to provide a high-efficiency and high-power motor with little vibration or noise. In addition, the tooth 120 can be easily inserted into the second recessed portion 133*d* provided with the foaming resin 152 before being foamed. Hence, excellent workability is obtained.

It is to be noted that the material of the foaming resin 152 and the shape of the second recessed portion 133*d* are not limited to the present embodiment. A foaming resin in a sheet form may be affixed to the second recessed portion 133*d*. In that case, the affixation of the sheet can be facilitated by making the shape of the second recessed portion 133*d* a rectangular shape. In addition, the foaming resin 152 may be provided to the first bottom face 120*c* of the tooth 120.

It is to be noted that the present invention is not limited to the foregoing embodiments, but includes various modifications. For example, the foregoing embodiments are described in detail to describe the present invention in an easily understandable manner, and are not necessarily limited to embodiments including all of the described configurations. In addition, a part of a configuration of a certain embodiment can be replaced with a configuration of another embodiment, and a configuration of another embodiment can be added to a configuration of a certain embodiment. In addition, for a part of a configuration of each embodiment, another configuration can be added, deleted, or substituted.

DESCRIPTION OF REFERENCE CHARACTERS

100: Stator

110: Coil

120: Tooth

120*c*: First bottom face

122*e*: First slope (side wall)

122*f*: Second slope (side wall)

130: Back yoke

133: First recessed portion

133*a*: Bottom face

135*b*: First side wall

135*c*: Second side wall

133*d*: Second recessed portion

140: Clearance

141*a*: First radial direction clearance

141*b*: Second radial direction clearance

150: Resin

151: Molding resin

152: Foaming resin

200: Rotor

800: Molding die

1000: Rotary electric machine

The invention claimed is:

1. A rotary electric machine comprising:
a rotor;
a stator surrounding a periphery of the rotor;
a first recessed portion disposed in an inner circumferential surface of a back yoke of the stator, and extending in an axial direction of the stator; and
a tooth having one end fitted in the first recessed portion,
a clearance formed between the first recessed portion and the one end of the tooth fitted in the first recessed portion being smaller in a circumferential direction of the stator than in a radial direction of the stator, and
a shortest distance between a side surface of the first recessed portion and the one end of the tooth is smaller than a shortest distance between a bottom surface of the first recessed portion and the one end of the tooth.

2. The rotary electric machine according to claim 1, wherein
a distance between a side face of the first recessed portion and the one end of the tooth is smaller than a distance between a bottom face of the first recessed portion and the one end of the tooth.

3. The rotary electric machine according to claim 1, wherein
a side face of the first recessed portion and the one end of the tooth are in contact with each other.

4. The rotary electric machine according to claim 1, wherein
the tooth is formed by a low-loss soft magnetic material.

5. A rotary electric machine comprising:
a rotor;
a stator surrounding a periphery of the rotor;
a first recessed portion disposed in an inner circumferential surface of a back yoke of the stator, and extending in an axial direction of the stator; and
a tooth having one end fitted in the first recessed portion,
a clearance formed between the first recessed portion and the one end of the tooth fitted in the first recessed portion being smaller in a circumferential direction of the stator than in a radial direction of the stator, wherein
a width of the first recessed portion in the circumferential direction of the stator decreases toward a central portion of the stator, and
a width of the tooth in the circumferential direction of the stator decreases from the one end of the tooth to another end of the tooth.

6. A rotary electric machine comprising:
a rotor;
a stator surrounding a periphery of the rotor;
a first recessed portion disposed in an inner circumferential surface of a back yoke of the stator, and extending in an axial direction of the stator; and
a tooth having one end fitted in the first recessed portion,
a clearance formed between the first recessed portion and the one end of the tooth fitted in the first recessed portion being smaller in a circumferential direction of the stator than in a radial direction of the stator, wherein
the tooth is formed by a low-loss soft magnetic material, and
an area of a part where the one end of the tooth and the first recessed portion face each other in the circumferential direction of the stator is larger than an area of another end of the tooth.

7. The rotary electric machine according to claim 1, wherein
a clearance formed between the first recessed portion and the one end of the tooth fitted in the first recessed portion is filled with a resin in contact with a bottom face of the first recessed portion and an end face of the one end of the tooth, the end face facing the bottom face of the first recessed portion.

8. A rotary electric machine comprising:

a rotor;

a stator surrounding a periphery of the rotor;

a first recessed portion disposed in an inner circumferential surface of a back yoke of the stator, and extending in an axial direction of the stator; and a tooth having one end fitted in the first recessed portion, a clearance formed between the first recessed portion and the one end of the tooth fitted in the first recessed portion being smaller in a circumferential direction of the stator than in a radial direction of the stator, wherein a clearance formed between the first recessed portion and the one end of the tooth fitted in the first recessed portion is filled with a resin in contact with a bottom face of the first recessed portion and an end face of the one end of the tooth, the end face facing the bottom face of the first recessed portion, the bottom face of the first recessed portion is provided with a second recessed portion extending in the axial direction of the stator, and the resin is filled in a first clearance formed between the second recessed portion and the one end of the tooth and a second clearance formed between a remaining bottom face resulting from excluding a part provided with the second recessed portion from the bottom face of the first recessed portion and the one end of the tooth.

9. The rotary electric machine according to claim 7, wherein the resin further covers side walls of the tooth in the circumferential direction of the stator.

10. The rotary electric machine according to claim 8, wherein a width W of the second recessed portion in a cross section of the stator is $$W > L \times \sin \theta \times 2$$

where a width of a slope of the tooth is L, and an angle that each of two side walls of the tooth in the circumferential direction of the stator forms with a normal to a peripheral surface of the back yoke, the normal passing through a center between the two side walls, is $\theta$.

11. The rotary electric machine according to claim 7, wherein the resin is formed by a thermosetting resin or a foaming resin.

12. The rotary electric machine according to claim 8, wherein the second recessed portion is provided to both ends of the bottom face of the first recessed portion.

13. The rotary electric machine according to claim 4, wherein the tooth is a trapezoidal column.

14. A method of manufacturing the rotary electric machine according to claim 8, the method comprising:

resin-molding the stator by covering the stator by using a molding die having a resin injection port located above the second recessed portion and on an outside diameter side of the stator or directly above the second recessed portion, and injecting the resin into the resin injection port.

* * * * *